(12) United States Patent
Zou et al.

(10) Patent No.: US 9,371,961 B2
(45) Date of Patent: Jun. 21, 2016

(54) INSTALLATION PART AND MODULE

(71) Applicant: Huawei Technologies Co., Ltd., Shenzhen, Guangdong (CN)

(72) Inventors: Guohui Zou, Shenzhen (CN); Wenjie Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 209 days.

(21) Appl. No.: 14/018,214

(22) Filed: Sep. 4, 2013

(65) Prior Publication Data

US 2014/0008380 A1 Jan. 9, 2014

Related U.S. Application Data

(63) Continuation of application No. PCT/CN2012/082954, filed on Oct. 15, 2012.

(30) Foreign Application Priority Data

May 28, 2012 (CN) ............................ 2012 1 0169183

(51) Int. Cl.
*A47B 96/06* (2006.01)
*F16M 13/02* (2006.01)
*H04M 1/02* (2006.01)
*H04M 1/11* (2006.01)

(52) U.S. Cl.
CPC ............. *F16M 13/022* (2013.01); *F16M 13/02* (2013.01); *H04M 1/0214* (2013.01); *H04M 1/11* (2013.01)

(58) Field of Classification Search
CPC .. F16M 13/02; F16M 13/022; H04M 1/0214; H04M 1/11

USPC .................................... 248/230.8; 455/575.1
See application file for complete search history.

(56) References Cited

U.S. PATENT DOCUMENTS 2,550,001 A * 4/1951 Button .................. F16L 3/1091
  248/49
3,894,707 A * 7/1975 Heard ........................ F16B 2/08
  248/225.11

(Continued)

FOREIGN PATENT DOCUMENTS

CN       2063180 U      10/1990
CN       2445127 Y      8/2001

(Continued)

OTHER PUBLICATIONS

Partial translation of Office Action dated Jul. 2, 2013 in connection with Chinese Patent Application No. 201210169183.0.

(Continued)

*Primary Examiner* — Todd M Epps

(57) ABSTRACT

Embodiments of the present invention provide an installation part and a module, relating to the field of mechanical designs and capable of reducing the quantity of installation parts and increasing the efficiency of assembling and disassembling an article that needs to be installed. The installation part includes: a slot configured to be clamped with a hoop, where the hoop is configured to fix a pole part onto a pole together with the pole part; and a first screw hole configured to be connected to a conversion bracket, where the conversion bracket is configured to connect the pole part and an article that needs to be installed. The embodiments of the present invention are applied to the installation of modules.

8 Claims, 7 Drawing Sheets

(56) References Cited

U.S. PATENT DOCUMENTS

2011/0108695 A1* 5/2011 Wang .................... F16M 11/12
248/248.1
2011/0233373 A1 9/2011 Ao et al.

FOREIGN PATENT DOCUMENTS

| CN | 2846444 Y | 12/2006 |
|----|-----------|---------|
| CN | 101271995 A | 9/2008 |
| CN | 101634393 A | 1/2010 |
| CN | 101753180 A | 6/2010 |
| CN | 201757104 U | 3/2011 |
| CN | 201795250 U | 4/2011 |
| CN | 202056486 U | 11/2011 |
| CN | 202203629 U | 4/2012 |
| CN | 102691868 A | 9/2012 |
| EP | 2 309 832 A1 | 4/2011 |

OTHER PUBLICATIONS

International Search Report dated Mar. 7, 2013 in connection with International Patent Application No. PCT/CN2012/082954.
Written Opinion of the International Searching Authority dated Mar. 7, 2013 in connection with International Patent Application No. PCT/CN2012/082954.

* cited by examiner

INSTALLATION PART AND MODULE

CROSS-REFERENCE TO RELATED APPLICATIONS

This application is a continuation of International Application No. PCT/CN2012/082954, filed on Oct. 15, 2012, which claims priority to Chinese Patent Application No. 201210169183.0, filed on May 28, 2012, both of which are hereby incorporated by reference in their entireties.

TECHNICAL FIELD

The present invention relates to the field of mechanical designs of handles, and in particular, to an installation part and a module.

BACKGROUND

In an existing communication system, some modules, for example, mini radio base station modules, featuring a small size and high integration, generally need to be installed at a height of 5 m to 8 m above the ground. However, because a module has many installation parts and the installation procedure is complicated, the efficiency of assembling and disassembling a module is low.

SUMMARY

Embodiments of the present invention provide an installation part and a module to increase the efficiency of assembling and disassembling a module.

To achieve the preceding objective, the embodiments of the present invention adopt the following technical solutions:

In one aspect, an installation part is provided, including:

a pole part, where the pole part includes a slot configured to be clamped with a hoop, the hoop being configured to fix the pole part onto a pole; and a first screw hole configured to be connected to a conversion bracket, where the conversion bracket is configured to connect the pole part and an article that needs to be installed.

In one aspect, a module is provided, including:

an article box, where the article box is configured to place an article; and a handle, where the handle is fixedly connected to the article box and the handle includes a third screw hole, the third screw hole being configured to be connected to the first screw hole the first screw hole foresaid through a screw.

Embodiments of the present invention provide an installation part and a module. The installation part includes: a pole part, where the pole part includes a slot configured to be clamped with a hoop, the hoop being configured to fix the pole part onto a pole together with the pole part; and a first screw hole configured to be connected to a conversion bracket, where the conversion bracket is configured to connect the pole part and an article that needs to be installed. In this way, the quantity of installation parts is reduced, and when installation is performed on the pole, it is only necessary to clamp the hoop with the pole part, and use the conversion bracket to connect the pole part and the article that needs to be installed. Because the installation procedure is simple, the quantity of installation parts is reduced, which increases the efficiency of assembling and disassembling the article that needs to be installed.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following descriptions show merely some embodiments of the present invention, and persons of ordinary skill in the art may still derive other drawings from the accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
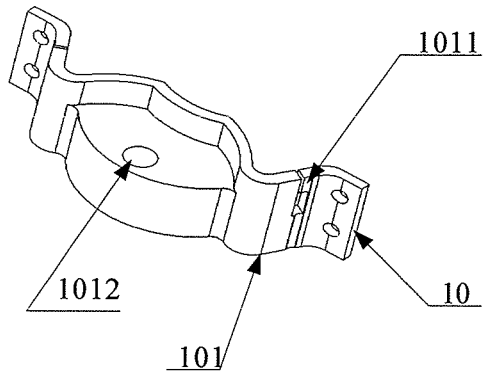
FIG. 1 is a schematic structural diagram of an installation part according to an embodiment of the present invention.

An embodiment of the present invention provides an installation part 10. As shown in FIG. 1, the installation part 10 includes:

a pole part 101, where the pole part 101 includes a slot 1011 configured to be clamped with a hoop (not marked in FIG. 1), the hoop being configured to fix the pole part onto a pole together with the pole part; and a first screw hole 1012 configured to be connected to a conversion bracket, where the conversion bracket (not marked in FIG. 1) is configured to connect the preceding pole part and an article that needs to be installed. The first screw hole 1012 may be arranged on an axis of the pole part 101, and connect the installation part to a module through a screw, so as to correspondingly install the article that needs to be installed.

In this way, the quantity of installation parts is reduced, and when installation is performed on the pole, it is only necessary to clamp the hoop with the pole part, and use the conversion bracket to connect the pole part and the article that needs to be installed. Because the installation procedure is simple, the quantity of installation parts is reduced, which increases the efficiency of assembling and disassembling the article that needs to be installed.

Figure 2:
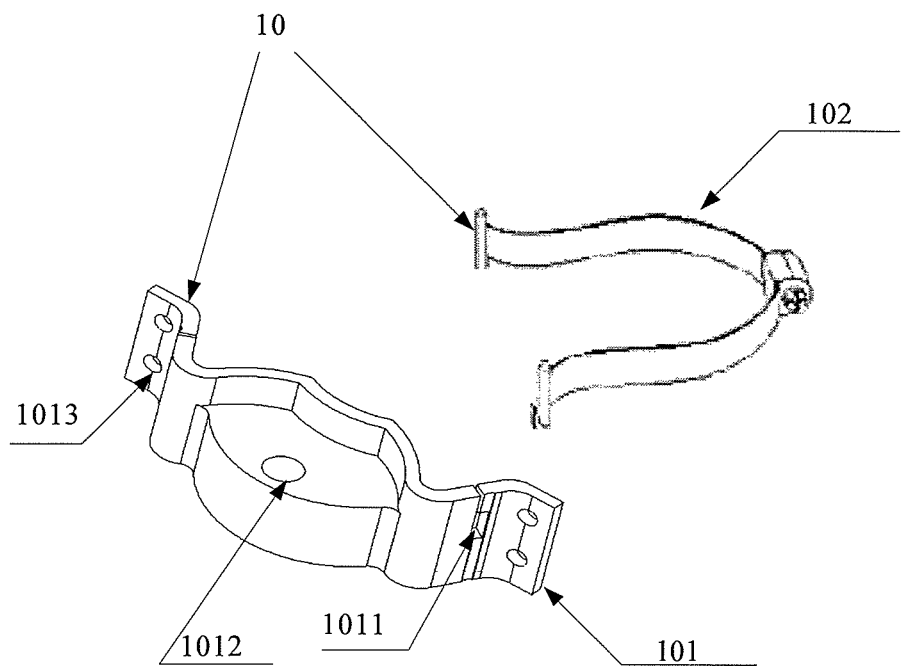
FIG. 2 is another schematic structural diagram of an installation part according to an embodiment of the present invention.

Furthermore, as shown in FIG. 2, the pole part 101 may further include second screw holes 1013 configured to be connected to a wall, so that the article that needs to be installed are installed on the wall. The second screw holes 1013 may be located at two ends of the pole part 101, and connected to the wall through screws. In this way, the pole part may also be installed on the wall as a wall-mounted part, which increases the utilization of the installation part and reduces the installation cost.

Figure 4:
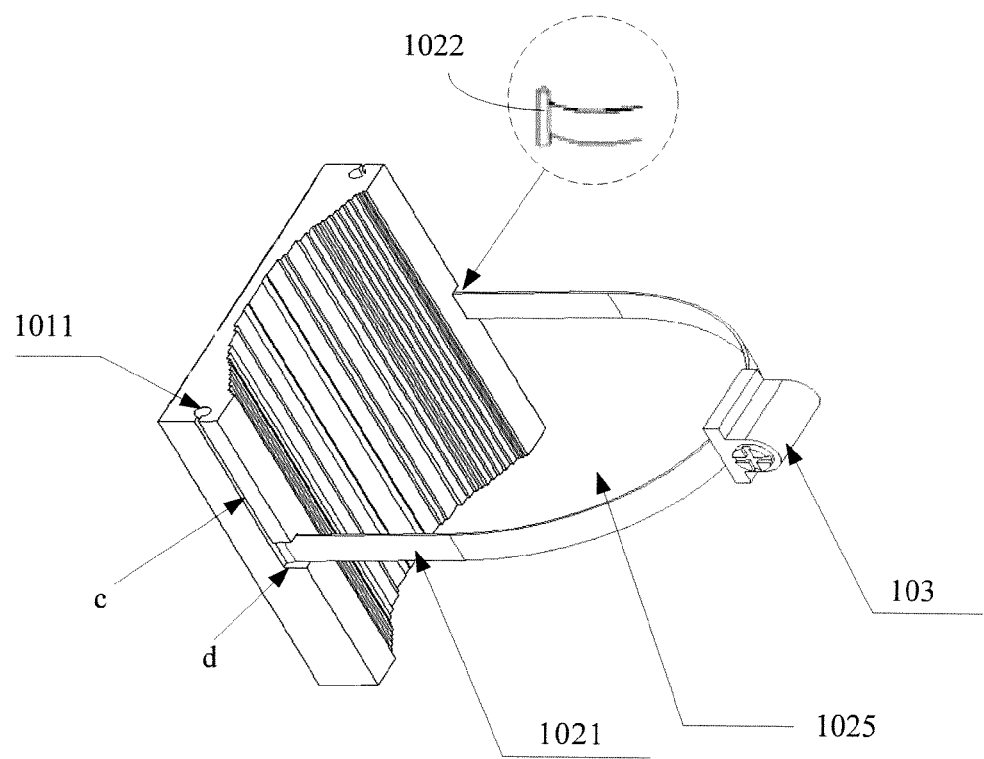
FIG. 4 is another schematic structural diagram of an installation part according to an embodiment of the present invention.

The installation part 10 may further include a hoop 102 configured to be clamped with the slot 1011 of the pole part 101; after the hoop 102 is clamped with the pole part 101, a hollow ring 1025 as illustrated in FIG. 4 is formed, and when a module is installed on a pole, the pole may be located in the hollow ring 1025.

Figure 3:
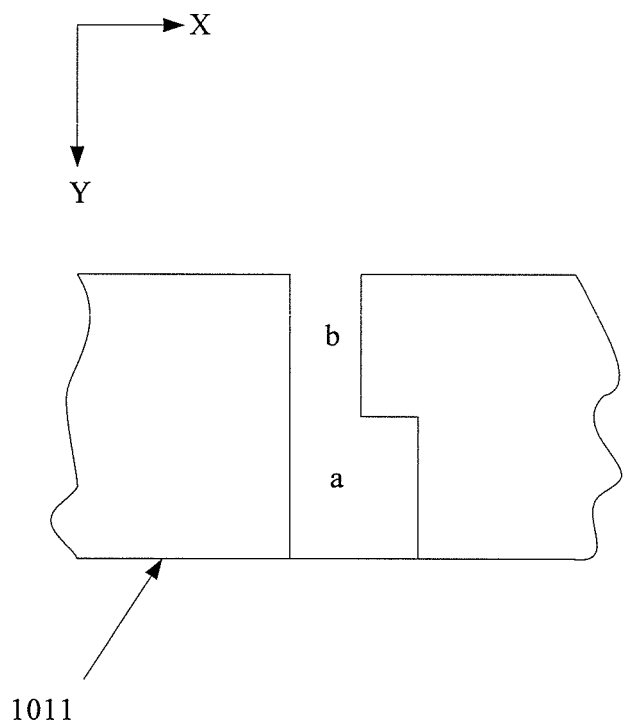
FIG. 3 is a schematic structural diagram of a first slot according to an embodiment of the present invention.

It should be noted that the hoop and the pole part may be may have multiple shapes so long as they can fit in with each other for clamping. As shown in FIG. 2, the hoop 102 may include a strip-shaped guiding mechanical part 1021 and two projecting mechanical parts 1022 respectively connected to two ends of the strip-shaped guiding mechanical part 1021, where either of the projecting mechanical parts 1022 is a cylindrical projecting block and the thickness of the strip-shaped guiding mechanical part is smaller than the diameter of the cylindrical projecting block. In this case, the slot 1011 may include a first rectangular hollow slot a and a second rectangular hollow slot b. Exemplarily, FIG. 3 illustrates a front view of the slot 1011. As shown in FIG. 3, the width of the first rectangular hollow slot a (that is, the length in the X direction in FIG. 3) is smaller than the diameter of the cylindrical projecting block and/or the length of the first rectangular hollow slot a (that is, the length in the Y direction in FIG. 3) is smaller than the height of the cylindrical projecting block; the first rectangular hollow slot a is clamped with the cylindrical projecting block. The second rectangular hollow slot b is arranged along the length direction (that is, the Y direction in FIG. 3) of the first rectangular hollow slot, with one end communicated with the first rectangular hollow slot a and the other end communicated externally, and the width of the second rectangular hollow slot b is smaller than the width of the first rectangular hollow slot a and greater than the thickness of the guiding mechanical part, so that the cylindrical projecting block is inserted along the Y direction of the second rectangular hollow slot. Because the cylindrical projecting block is integrated with the guiding mechanical part, during installation, the guiding mechanical parts at two sides of the hoop are inserted, along the Y direction, into the first rectangular hollow slot a from the second rectangular hollow slot b; after the installation is completed, a hollow ring is formed. At this time, the cylindrical projecting block and the slot receive force vertical to the XY plane. In addition, because the width of the first rectangular hollow slot is smaller than the diameter of the cylindrical projecting block and/or the length of the first rectangular hollow slot is smaller than the height of the cylindrical projecting block, that is, the projection area of the cylindrical projecting block on the XY plane is greater than the slot area, the hoop is clamped with the pole part. Further, to prevent loosening of the clamping between the hoop and the pole part, the cylindrical projecting block may be rotated by a specific angle after being clamped with the slot, so that the clamping is firmer. Particularly, the X direction, Y direction, and XY plane in FIG. 3 are only for illustration, and are not limited in the present invention.

Exemplarily, as shown in FIG. 4, the hoop may be a strip-shaped guiding mechanical part 1021 and two projecting mechanical parts 1022 respectively connected to two ends of the strip-shaped guiding mechanical part 1021, where either of the projecting mechanical parts 1022 is a cylindrical projecting block and the thickness of the strip-shaped guiding mechanical part 1021 is smaller than the diameter of the cylindrical projecting block 1022. In this case, the slot 1011 may also be a cylindrical recess whose diameter is greater than the diameter of the cylindrical projecting block 1022; one end of the cylindrical recess 1011 is connected externally and a rectangular slot c is arranged in the radial direction of the cylindrical recess 1011, where the width of the rectangular slot c is smaller than the diameter of the cylindrical projecting block 1022 and greater than the thickness of the guiding mechanical part 1021, so that the cylindrical projecting block 1022 is inserted inside the slot along the length direction of the rectangular slot c; a rectangular opening d is arranged at the other end of the cylindrical recess 1011 and is clamped with the inserted cylindrical projecting block 1022. During installation, the projecting mechanical part 1022 is inserted in the cylindrical recess 1011, and the width of the rectangular slot c is smaller than the diameter of the cylindrical projecting block 1022, which may prevent the cylindrical projecting block from sliding; the width of the rectangular slot c is greater than the thickness of the guiding mechanical part 1021, so that the cylindrical projecting block integrated with the guiding mechanical part may be inserted along the length direction of the rectangular slot c; when the guiding mechanical part 1021 is moved to the rectangular opening d, it may be clamped with the pole part.

It should be noted that multiple connection manners may be available for the installation part. The preceding methods are merely examples for illustration, but are not intended to limit the protection scope of the present invention. Any variation or replacement readily figured out by persons skilled in the art within the technical scope disclosed in the present invention shall all fall within the protection scope of the present invention.

Furthermore, as shown in FIG. 4, the hoop may be further provided with a length adjustment part 103 configured to adjust the length of the installation part, so as to ensure the firm installation of the installation part. For the specific structure of the length adjustment part, reference maybe made to a length adjustment apparatus in the prior art, and is not further described herein.

According to the present invention, the quantity of installation parts is small, which reduces the installation cost. In addition, when installation is performed on the pole, it is only necessary to clamp the hoop with the pole part, and use the conversion bracket to connect the pole part and the article that needs to be installed. Because the installation procedure is simple, the quantity of installation parts is reduced, which increases the efficiency of assembling and disassembling the article that needs to be installed.

Figure 5:
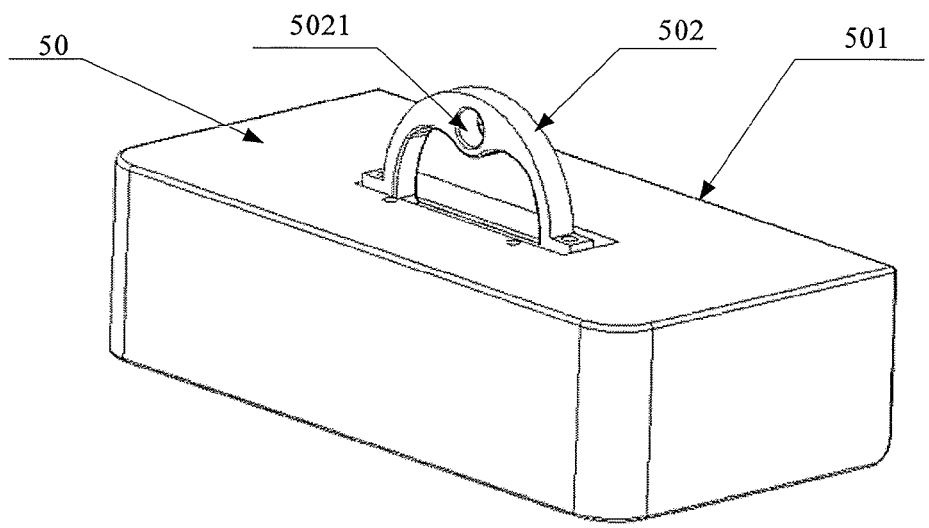
FIG. 5 is a schematic structural diagram of a module according to an embodiment of the present invention.

An embodiment of the present invention provides a module 50. As shown in FIG. 5, the module 50 includes:
- an article box 501, where the article box 501 is configured to place an article; and
- a handle 502, where the handle 502 is fixedly connected to the article box 501 and the handle 502 includes a third screw hole 5021, the third screw hole 5021 being configured to be connected to any first screw hole provided in embodiments of the present invention through a screw.

The handle 502 may have a recessed or hollowed shape, so that a user can hold it conveniently.

In this way, the preceding handle not only implements the basic holding function of a handle but also acts as a conversion bracket and an installation part in the installation of the module, which reduces the quantity of installation parts and improves the efficiency of assembling and disassembling the module.

Furthermore, the handle 502 may further include a hoisting hole (not marked in FIG. 5) configured to hoist the module. The hoisting hole may be a circular through-hole, so that a rope can be routed conveniently in the case of hoisting. Particularly, the hoisting hole may be integrated with the third screw hole 5021, so as to hoist the module in the case of working at heights and at the same time simplify the structure of the handle.

Figure 6:
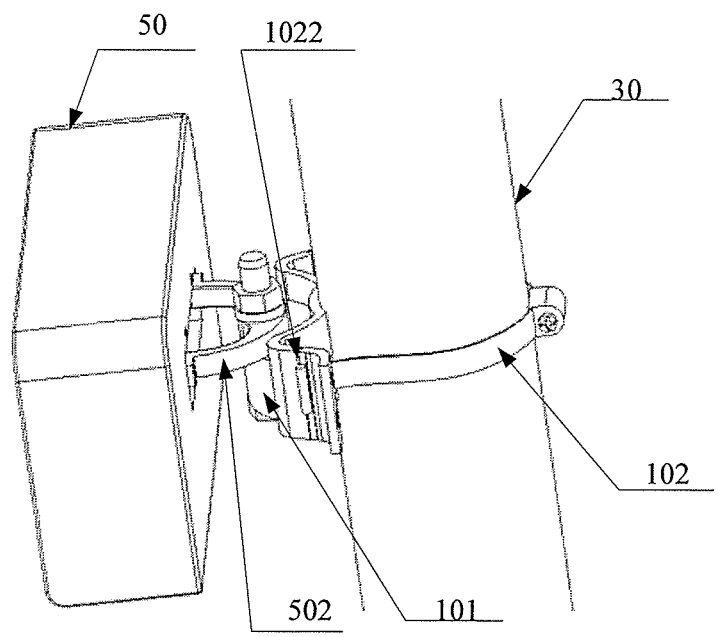
FIG. 6 is a schematic installation diagram of a module according to an embodiment of the present invention.
Figure 7:
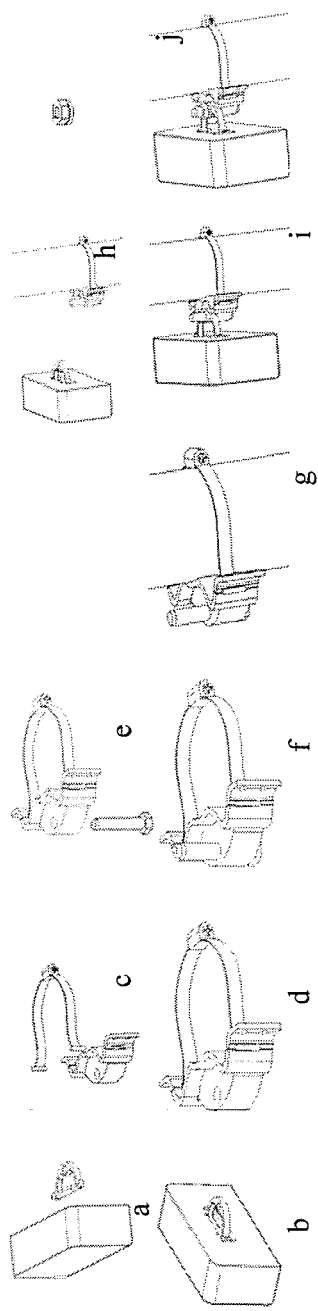
FIG. 7 is a schematic diagram of an installation procedure of a module according to an embodiment of the present invention.

Exemplarily, as shown in FIG. 6, when a module 50 is installed on a pole 30, one end of a screw is passed through corresponding screw holes on a handle 502 and a pole part 101, and the other end of the screw is fixed by using a nut. The pole part 101 and a projecting mechanical part 1022 on a hoop 102 are clamped onto the pole 30. As shown in FIG. 7, a specific installation process is as follows: Firstly, a module and a handle shown in FIG. a are connected through screws or fixedly connected in other connection manners, and a structure shown in FIG. b is obtained; secondly, a hoop and a pole part shown in FIG. c are clamped and fixed onto a pole, and a structure shown in FIG. d is obtained; thirdly, a screw shown in FIG. e is tightened from the bottom of a screw hole on the connected installation part, and a structure shown in FIG. f is obtained. The pole is not marked in FIG. c to FIG. f. FIG. g illustrates a specific state of FIG. f where the pole is included in the actual situation. Then, a screw hole on the handle and the installation part shown in FIG. h are connected through the screw, and a structure shown in FIG. i is obtained; finally, a nut corresponding to the screw in FIG. j is tightened at the top of the screw, and the installation is completed.

Particularly, the preceding installation method is only an example for illustration, and the installation steps of the method may specifically be added or reduced according to the module, which is not limited in the present invention.

Figure 8:
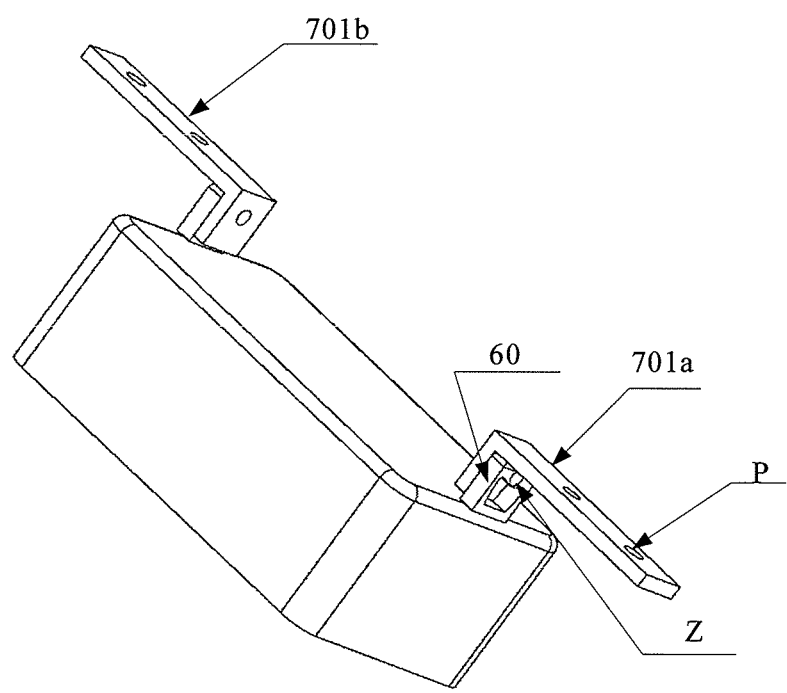
FIG. 8 is a schematic installation diagram of a module according to an embodiment of the present invention.

It should be noted that the quantity of handles and specific forms of screw holes in the module provided in this embodiment are not limited in the present invention. Exemplarily, when two handles exit, the module may be easily lifted; when the module needs to be fixed on a plane, as shown in FIG. 8, the installation part may include an installing part 701a and an installing part 701b. The screw hole at one end of the installing part 701a and a screw hole Z on a handle 60 are fixedly connected through a threaded rod and a nut that can be tightened at the end of the threaded rod, while the other end is fixedly connected to a wall (not marked in FIG. 8) through a screw passed through a screw hole P. On one hand, the screw hole Z may be used as a hoisting part, so that the module is hoisted conveniently by a rope passed through the screw hole Z at the time of working at heights; on the other hand, the screw hole Z maybe used as a positioning part to fix, in cooperation with the installing part 701a, the module onto the plane. Particularly, multiple screw holes Z and screw holes P may exit. The quantity of screw holes Z and screw holes P may be specifically designed according to the weight and installation position of the module.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the appended claims.

What is claimed is:

1. An installation part for use in a telecommunication system, the installation part comprising:
 a pole part comprising a slot configured to be clamped with a hoop, the hoop configured to fix the pole part onto a pole together with the pole part;
 a first screw hole configured to be connected to a conversion bracket, wherein the conversion bracket is configured to connect the pole part and an article that needs to be installed; and
 a module comprising:
  an article box, wherein the article box is configured to place an article therein; and
  a handle, wherein the handle is fixedly connected to the article box and the handle comprises a third screw hole, the third screw hole configured to be connected to the first screw hole through a screw.

2. The installation part according to claim 1, wherein the pole part further comprises:
 second screw holes configured to be connected to a wall, so that the article that needs to be installed is installed on the wall.

3. The installation part according to claim 1, wherein the hoop is configured to be clamped with the slot and a hollow ring is formed after the hoop is clamped with the pole part.

4. The installation part according to claim 3, wherein:
 the hoop comprises a strip-shaped guiding mechanical part and two projecting mechanical parts respectively connected to two ends of the strip-shaped guiding mechanical part, wherein either of the projecting mechanical parts is a cylindrical projecting block and a thickness of the strip-shaped guiding mechanical part is smaller than a diameter of the cylindrical projecting block; and
 the slot comprises a first rectangular hollow slot and a second rectangular hollow slot, wherein:
  a width of the first rectangular hollow slot is smaller than the diameter of the cylindrical projecting block, and a length of the first rectangular hollow slot is smaller than the height of the cylindrical projecting block, and the first rectangular hollow slot is clamped with the cylindrical projecting block, and
  the second rectangular hollow slot is arranged along the length direction of the first rectangular hollow slot, with one end communicated with the first rectangular hollow slot and the other end communicated externally, and a width of the second rectangular hollow slot is smaller than the width of the first rectangular hollow slot and greater than the thickness of the guiding mechanical part, so that the cylindrical projecting block is inserted along the length direction of the second rectangular hollow slot.

5. The installation part according to claim 3, wherein:
 the hoop comprises a strip-shaped guiding mechanical part and two projecting mechanical parts respectively connected to two ends of the strip-shaped guiding mechanical part, wherein either of the projecting mechanical parts is a cylindrical projecting block and a thickness of the strip-shaped guiding mechanical part is smaller than a diameter of the cylindrical projecting block; and
 the slot is a cylindrical recess of which a diameter is greater than the diameter of the cylindrical projecting block, wherein one end of the cylindrical recess is connected externally and a rectangular slot is arranged in a radial direction of the cylindrical recess, wherein the width of the rectangular slot is smaller than the diameter of the cylindrical projecting block and greater than the thickness of the guiding mechanical part, so that the cylindrical projecting block is inserted inside the cylindrical recess along a length direction of the rectangular slot, wherein a rectangular opening is arranged at the other end of the cylindrical recess and is configured to be clamped with the inserted cylindrical projecting block.

6. The installation part according to claim 3, wherein:
the hoop is provided with a length adjustment part configured to adjust a length of the hoop.

7. The module according to claim 1, wherein:
the handle further comprises a hoisting hole configured to hoist the module.

8. The module according to claim 7, wherein:
the hoisting hole is integrated with the third screw hole.

\* \* \* \* \*